(12) United States Patent
Andjelic

(10) Patent No.: US 7,451,456 B2
(45) Date of Patent: Nov. 11, 2008

(54) NETWORK DEVICE DRIVER ARCHITECTURE

(75) Inventor: Mario Andjelic, Hägersten (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 103 days.

(21) Appl. No.: 10/517,724

(22) PCT Filed: Jun. 19, 2002

(86) PCT No.: PCT/SE02/01225

§ 371 (c)(1),
(2), (4) Date: Dec. 10, 2004

(87) PCT Pub. No.: WO04/001615

PCT Pub. Date: Dec. 31, 2003

(65) Prior Publication Data

US 2005/0210479 A1 Sep. 22, 2005

(51) Int. Cl.
G06F 9/46 (2006.01)
G06F 13/14 (2006.01)

(52) U.S. Cl. ....................... 719/321; 709/224

(58) Field of Classification Search ........ 719/321; 709/224, 227; 713/1, 2
See application file for complete search history.

(56) References Cited

U.S. PATENT DOCUMENTS 6,658,469 B1 * 12/2003 Massa et al. ............... 709/224
7,007,157 B2 * 2/2006 Morris et al. ............... 713/1

FOREIGN PATENT DOCUMENTS

WO WO 9939254 5/1999

WO WO 9939254 A2 * 8/1999

OTHER PUBLICATIONS

Pratt, I et al: "Arsenic: a user-accessible gigabit Ethernet interface" (IEEE, vol. 1, 2001).*
Dunning, D. et al: "The virtual Interface architecture" (IEEE, vol. 18 Issue:2, Mar./Apr. 1998).*
"Software support for virtual memory-mapped communication", Dubnicki, C.; Iftode, L.; Felten, E.W.; Kai Li, Parallel Processing Symposium, 1996., Proceedings of IPPS '96, The 10th International Apr. 15-19, 1996 pp. 372-381.*

(Continued)

*Primary Examiner*—Meng-Ai An
*Assistant Examiner*—Abdou K Seye

(57) ABSTRACT

The invention proposes a network device driver architecture with functionality distributed between kernel space and user space. The overall network device driver comprises a kernel-space device driver (10) and user-space device driver functionality (20). The kernel-space device driver (10) is adapted for enabling access to the user-space device driver functionality (20) via a kernel-space-user-space interface (15). The user-space device driver functionality (20) is adapted for enabling direct access between user space and the NIC (30) via a user-space-NIC interface (25), and also adapted for interconnecting the kernel-space-user-space interface (15) and the user-space-NIC interface (25) to provide integrated kernel-space access and user-space access to the NIC (30). The user-space device driver functionality (20) provides direct, zero-copy user-space access to the NIC, whereas information to be transferred between kernel space and the NIC will be "tunneled" through user space by combined use of the kernel-space device driver (10), the user-space device driver functionality (20) and the two associated interfaces (15, 25).

6 Claims, 10 Drawing Sheets

OTHER PUBLICATIONS

Cezary Dubnicki et al ("Software Support for Virtual Memory-Mapped Communication", 1996, pp. 372-381).*
INFOCOM 2001. Twenthieth Annual Joint Conference of the IEEE Computer and Communications Societes. Proceedings. IEEE, vol. 1, 2001, Pratt, I. Et al: "Arsenic: a user-accessible gigabit Ethernet interface", p. 67-p. 76, abstract, figure 1.
Parallel Processing Symposium, 1996., Proceedings of IPPS '96, The 10th International, Apr. 15-19, 1996, Dubnicki, C. et al: "Software support for virtual memory-mapped communication", p. 372-p. 381, p. 372-p. 373, p. 376-p. 378, abstract, figure 3.
Micro, IEEE, vol. 18 Issue: 2, Mar./Apr. 1998, Dunning, D. et al: "The Virtual Interface Architecture", p. 66-p. 76, the whole document.
INFOCOM 2001. Twentieth Annual Joint Conference of Proceedings. IEEE, vol. 1, 2001, Pratt, I. Et al.: Arsenic: A User-Accessible Gigabit Ethernet Interface, pp. 67-76, Abstract, Figure 1.

* cited by examiner

NETWORK DEVICE DRIVER ARCHITECTURE

TECHNICAL FIELD OF THE INVENTION

The present invention generally relates to a network device driver architecture for efficient and flexible access to a network interface controller (NIC).

BACKGROUND OF THE INVENTION

Computer software can generally be divided into two types, operating system software and application software. The operating system (OS) can be viewed as a resource manager that makes the computer's resources such as processors, memory, input/output (I/O) devices and communication devices available to the users. It also provides the base functionality upon which application software can be written and executed. Important operating system functions include sharing hardware among users, preventing users from interfering with each other, resource scheduling, organizing data for secure and rapid access, and supporting I/O functions and network communications.

The central part of the OS is commonly referred to as the kernel. The kernel is normally only a portion of the code of what is commonly thought of as the entire OS, but it is one of the most intensively used portions of the code. The kernel defines the so-called user-space, in which the application software runs, and provides services to user applications, including memory management, allocating processing resources, and responding to system calls from user applications or processes. Other important kernel functions include interrupt handling, process management and synchronization, as well as I/O management including network communications.

Since many different hardware devices can be connected to the computer system, some of the I/O functionality is typically implemented as common functionality that is device independent. Device related functionality is then allocated within so-called device drivers. This means that a user application that needs to access a particular hardware device, such as a network communication device, makes a system call to the OS, which in turn invokes the device driver associated with the hardware device.

A Network Interface Controller (NIC) is a hardware device that is commonly connected to computer systems for providing network communication capabilities, such as Ethernet or ATM communication. NIC controllers usually implement lower-level protocols, such as layer 1 (PHY) and layer 2 (MAC, LLC) protocols, whereas higher level protocols (e.g. the TCP/IP protocol suite) traditionally are allocated in the OS, running in kernel mode. Moreover, clusters, for example, usually have proprietary protocols running on top of Ethernet because TCP/IP (Transport Communication Protocol/Internet Protocol) is not very well suited for cluster computing in System Area Networks (SANs). These proprietary protocols are generally also running in kernel mode.

However, centralized in-kernel protocol processing prevents user applications from realizing the potential raw performance offered by the underlying high-speed networks. The performance problem is mainly caused by message copying between user space and kernel space, polluted cache, interrupts and non-optimized code. The intensive message copying creates a large overhead, especially for short messages, and constitutes the main reason for high processor load and low throughput of network subsystems with standard operating systems.

This problem has become more pronounced with the advent of high-performance network communication technologies such as Gigabit Ethernet, ATM and Infiniband. The main challenge in putting such high-performance communication technologies into use lies primarily in building systems that can efficiently interface these network media and sustain high bandwidth all the way between two network communicating applications.

This has lead the computer industry to develop network device drivers that support NIC access directly from user space, avoiding message copying between user space and kernel space. The most commonly known example of this type of user-space network access architecture is the Virtual Interface Architecture (VIA) developed by Intel Corporation, Microsoft Corporation and Compaq Computer Corporation. The Virtual Interface Architecture (VIA) is an industry standard for System Area Networks that supports direct, zero-copy user-space access to the NIC. The VIA Architecture was designed to eliminate message copying, per-message interrupts and other kernel overhead that have made traditional networked applications become performance bottlenecks in the past. As described, e.g. in the specification *Intel Virtual Interface (VI) Architecture Developer's Guide*, Sep. 9, 1998 and the International Patent Application WO 00/41358, the VIA Architecture avoids intermediate data copies and by-passes the operating system kernel to achieve low latency, high bandwidth communication. The VIA model includes a VI consumer and a VI provider. The VI consumer typically includes a user application and an operating systems communication facility and a VI user agent. The VI provider typically includes the combination of a VI NIC and a VI kernel agent. The Virtual Interface (VI) is a direct interface between a VI NIC and a user application or process. The VI allows the NIC to directly access the user application's memory for data transfer operations between the application and the network. The VI generally comprises a send queue and a receive queue, each of which can be mapped directly to user address space, thus giving direct user-space access to the network level and by-passing the operating system kernel.

The technical report *DART—A Low Overhead ATM Network Interface Chip*, TR-96-18, July 1996 discloses an ATM NIC designed for high bandwidth, low overhead communication, by providing direct, protected application access to/from the network.

The main drawback of the VIA architecture (and similar architectures) is that it requires special VIA-enabled NIC controllers, and can not run on off-the-shelf NIC controllers such as ordinary Ethernet NIC controllers. Since a lot of functionality for network communication rely on kernel-level protocols such as TCP/IP, both a VIA-enabled NIC and an ordinary Ethernet (TCP/IP) NIC are required with the VIA architecture. The VIA architecture is thus not optimized for implementation into existing systems, but generally requires hardware re-design of existing systems, adding an extra NIC and/or NIC port to the system. Re-designing a circuit board, including design, testing, product handling, maintenance, spare parts, etc. may easily lead to extra costs in the order of millions of dollars.

SUMMARY OF THE INVENTION

The present invention overcomes these and other drawbacks of the prior art arrangements.

It is a general object of the present invention to provide efficient and flexible access to a network interface controller (NIC), eliminating the CPU as the bottleneck in the communication chain.

It is also an object of the invention to provide an improved and cost-optimized network device driver architecture. In particular, it is beneficial if the network device driver architecture is suitable for implementation and integration into existing systems.

Yet another object of the invention is to provide a robust and flexible network device driver that is not NIC dependent and works with any off-the-shelf NIC hardware. These and other objects are met by the invention as defined by the accompanying patent claims.

The general idea of invention is to provide an efficient, flexible and cost-effective network device driver architecture by means of integrated kernel-space access and user-space access to the NIC, preferably over the same NIC port. This is accomplished by enabling direct user-space access to the NIC, in similarity to user-space network access architectures, and most importantly enabling user-space tunneled access between kernel-space and the NIC.

From an architectural point of view, the novel network device driver architecture normally comprises a kernel-space device driver as well as user-space device driver functionality. The kernel-space device driver is adapted for enabling access between kernel space and user space via a kernel-space-user-space interface. The user-space device driver functionality is adapted for enabling direct access between user space and said NIC via a user-space-NIC interface. This user-space device driver functionality is also adapted for interconnecting the kernel-space-user-space interface and the user-space-NIC interface to enable integrated kernel-space access and user-space access to the NIC. In this way, efficient user-space access to the NIC is obtained, while at the same time kernel-level protocols are allowed to run over the same NIC.

Preferably, the kernel-space device driver has two different operational modes. In the first mode, the kernel-space device driver is operable for directly accessing the NIC via a kernel-space-NIC interface. In the second mode, also referred to as user-space tunneled access mode, the kernel-space device driver is operable for accessing the NIC via the user-space device driver functionality.

Advantageously, the user-space device driver functionality is configured for execution in application context of a user application, for example implemented as user library functionality. For robustness and security, when the user-space tunneled access mode is activated, the operating system orders the kernel-space device driver to switch back to the first operational mode if the user application crashes. As a second line of defense, or as an alternative, the kernel-space device driver may optionally be provided with a watchdog that switches back to the first operational mode if there has been no call from the user-space device driver functionality for a predetermined period of time.

In a preferred implementation, the kernel-space device driver has two basic building blocks, the network device driver core and a kernel space agent. The network device driver core is preferably based on a standard network device driver, for example obtained from a commercial vendor, with additional functionality for making the device driver work in both default mode as well as the user-space tunneled access mode of the invention. In default mode, the network device driver core operates as an ordinary network device driver, directly accessing the NIC. In user-space tunneled access mode, the driver core routes outgoing data to the kernel agent and receives incoming data from the kernel agent. The kernel agent manages the kernel-space-user-space interface, and supports transfer of information to/from the user-space device driver functionality. The kernel agent generally comprises functionality common to different types of NIC controllers, thus allowing easy adaptation of standard network device drivers for a particular NIC to the novel network device driver architecture supporting user-space tunneled access between kernel space and the NIC.

In conclusion, the invention allows simultaneous user-space and kernel-space access to the network layer over the same NIC port, thus leading to a reduction of the number of required NIC ports and eliminating the need for hardware re-design. By running on top of the same NIC, smaller footprint/cost and better network utilization can be achieved. The novel network device driver architecture is well suited for applications that need high performance network communication as well as functionality relying on kernel-level protocols. Examples of such applications can be found in embedded environments, communication systems and so forth.

It should be understood that the expressions "NIC access" and "access to the NIC" include both sending information to and receiving information from the network level.

Other benefits of the novel network device driver architecture include:

Reduced hardware space and power dissipation, which is especially important for embedded type of systems;

Less cabling;

Reduced number of ports required on the associated communication switches, thus allowing the use of smaller and cheaper switches; and Efficient use of bandwidth in the network.

Further advantages offered by the present invention will be appreciated upon reading of the below description of the embodiments of the invention.

BRIEF DESCRIPTION OF THE DRAWINGS

The invention, together with further objects and advantages thereof, will be best understood by reference to the following description taken together with the accompanying drawings, in which.

DETAILED DESCRIPTION OF EMBODIMENTS OF THE INVENTION

Figure 1:
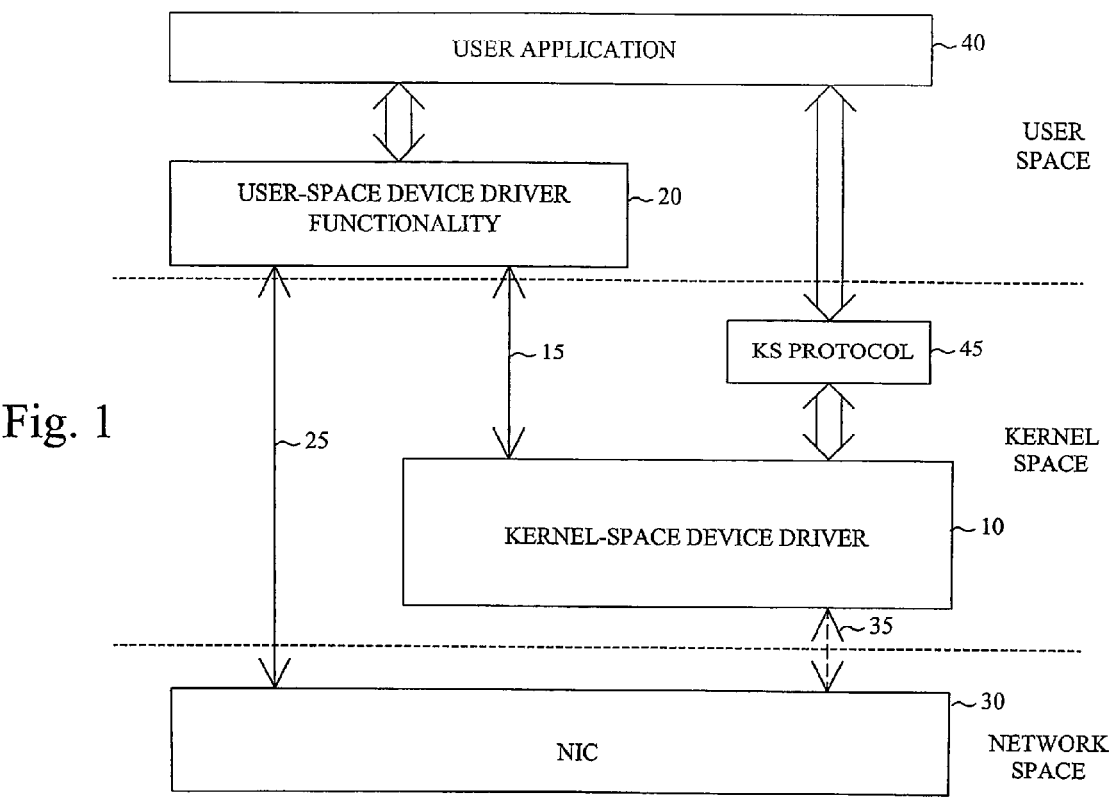
FIG. 1 is a schematic general block diagram of a network device driver architecture according to a preferred embodiment of the invention.

Throughout the drawings, the same reference characters will be used for corresponding or similar elements.

FIG. 1 is a schematic general block diagram of a network device driver architecture according to a preferred embodiment of the invention. The network device driver architecture is illustrated in its system environment, including user space, kernel space as well as network space.

The invention proposes a network device driver architecture in which a fraction of the standard device driver functionality is distributed to user space providing direct NIC communication, and the kernel-space device driver has additional functionality for NIC access via user space. The network device driver functionality is thus distributed between kernel space and user space, and the overall network device driver comprises a kernel-space device driver 10 and user-space device driver functionality 20. The kernel-space device driver 10 is adapted for enabling access to the user-space device driver functionality 20 via a kernel-space-user-space interface 15. The user-space device driver functionality 20 is adapted for enabling direct access between user space and the NIC 30 via a user-space-NIC interface 25, and also adapted for interconnecting the kernel-space-user-space interface 15 and the user-space-NIC interface 25 to provide integrated kernel-space access and user-space access to the NIC 30. The user-space device driver functionality 20 provides direct, zero-copy user-space access to the NIC, whereas information to be transferred between kernel space and the NIC will be "tunneled" through user space by combined use of the kernel-space device driver 10, the user-space device driver functionality 20 and the two associated interfaces 15, 25.

In this way, efficient user-space access to the NIC 30 is obtained, while at the same time kernel-level protocols 45 are allowed to run over the same NIC. The network device driver architecture of the invention supports usage of a dedicated NIC port for user-space traffic to/from a user application 40, but also supports efficient sharing of the same port for both kernel-level protocols and user-level protocols. The possibility of sharing the same NIC port generally opens up for cost-optimized solutions. Another important benefit of sharing the same NIC port is the possibility to integrate the novel device driver architecture into existing systems without hardware modifications. Thus, system re-design may be avoided, leading to cost savings in the order of several million dollars.

Preferably, the kernel-space device driver 10 has two different operational modes. In the first mode, the kernel-space device driver 10 operates as a standard network device driver directly accessing the NIC 30 via a kernel-space-NIC interface 35. In the second mode, also referred to as user-space tunneled access mode, the kernel-space device driver 10 is operable for accessing the NIC 25 by means of the user-space tunneling mechanism described above.

Advantageously, the user-space device driver functionality 20 is configured for execution in application context of a user application 40, for example implemented as user library functionality. It is important that the kernel-level protocols 45 are not stalled in the case of a user application crash or deadlock. In user-space tunneled access mode, the operating system orders the kernel-space device driver 10 to switch back to the first operational mode if the user application crashes. The kernel-space device driver 10 now accesses the same NIC port as the user application did before it crashed. As a second line of defense, or as an alternative, the kernel-space device 10 driver may be provided with an optional software watchdog 12 that switches back to the first operational mode if there is no call from the user-space device driver functionality 20 for a predetermined period of time. Alternatively, a counter-based hardware watchdog can be connected to the network device driver architecture.

Figure 2:
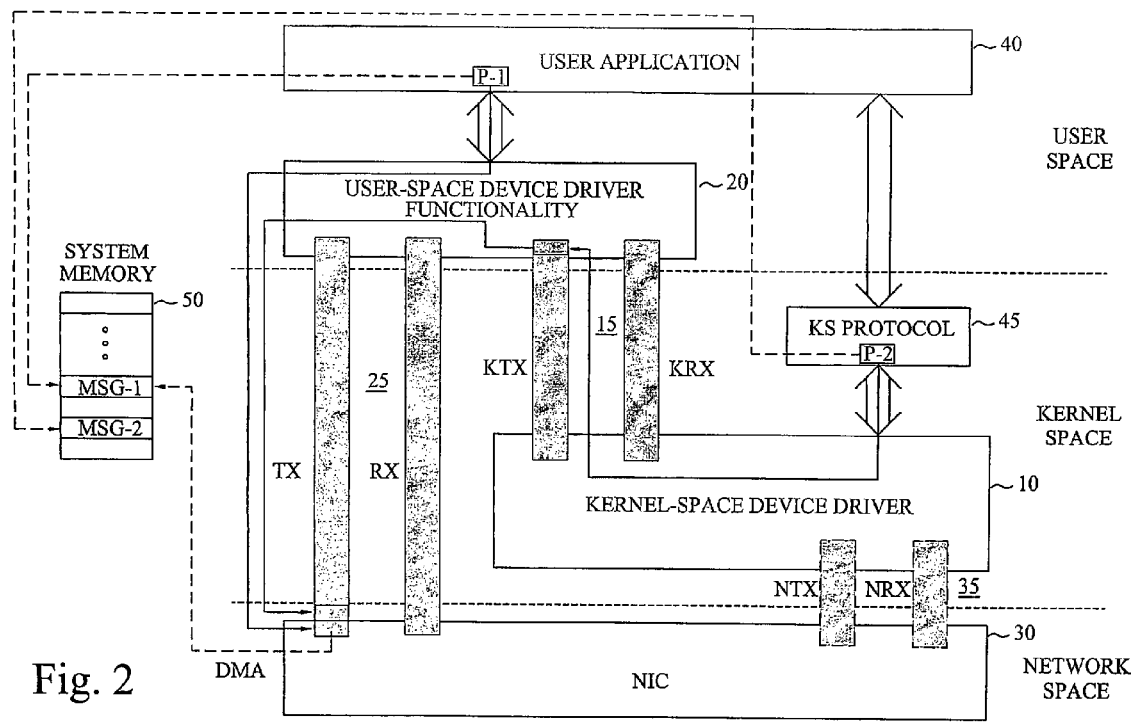
FIG. 2 illustrates integrated user-space access and kernel-space access to the NIC supported by zero-copy message transfer within the network device driver according to the invention.

In a preferred embodiment of the invention, all of the communication interfaces 15, 25 and 35 within the novel network device driver architecture support zero-copy transfer of information. For a better understanding of the invention, an example of integrated user-space access and kernel-space access to the NIC supported by zero-copy message transfer within the network device driver will now be described with reference to FIG. 2. Each of the interfaces 15, 25 and 35 is preferably based on a shared memory structure, for example in the form of buffer queues. Each interface is normally associated with a send queue (KTX; TX; NTX) and a receive queue (KRX; RX; NRX). The buffer queues are typically adapted for holding pointer information, and accessed by writing for the tail and reading from the head. The pointer information points to the real data such as a message stored in common memory.

The information transfer will now be described in the outbound direction from user application to NIC, both for user-level protocols as well as for kernel-level protocols. It is apparent that the information transfer is similar in the inbound direction.

In the case of a user-space terminated protocol, a message MSG-1 to be sent from a user application 40 to the NIC 30 is stored in common system memory 50 or any other memory that can be accessed by the involved system components. A pointer P-1 that points (dashed line) to the corresponding memory position in system memory 50 is delivered to the user-space device driver functionality 20 together with a request for NIC access. The user-space device driver functionality 20 puts the pointer into the TX queue (located in user address space) of the user-space-NIC interface 25. The NIC 30 subsequently consumes the message by reading the pointer from the TX queue and performing a direct memory access (DMA) from the corresponding position in the system memory 50 to fetch the message.

In the case of a user application 40 in need of a kernel-level protocol, the user application makes a corresponding system call, and the message to be transferred to the NIC 30 is copied into kernel-space and handled by the invoked kernel-space protocol 45. Once the message MSG-2 is in kernel-space, there will generally be no more message copying. Instead, the kernel-level protocol 45 delivers a pointer P-2 that points (dashed line) to the memory position of the message in system memory 50 to the kernel-space device driver 10, which inserts the pointer into the KTX queue of the kernel-space-user-space interface 15. The user-space device driver functionality 20 polls the KTX queue and moves the pointer to the TX queue of the user-space-NIC interface 25. Once, the pointer has moved to the head of the queue, the NIC 30 will read the pointer and fetch the corresponding message through a DMA access to system memory 50.

Preferably, all buffer queues are allocated in kernel address space by the kernel-space device driver. The queues are mapped to the address space of the user-space device driver functionality. To make the queues visible to the NIC, they are first mapped to the NIC bus address space and the obtained addresses are then written to the specific NIC registers.

By working with message pointers, instead of complete messages, there will be no actual message copying.

Figure 3:
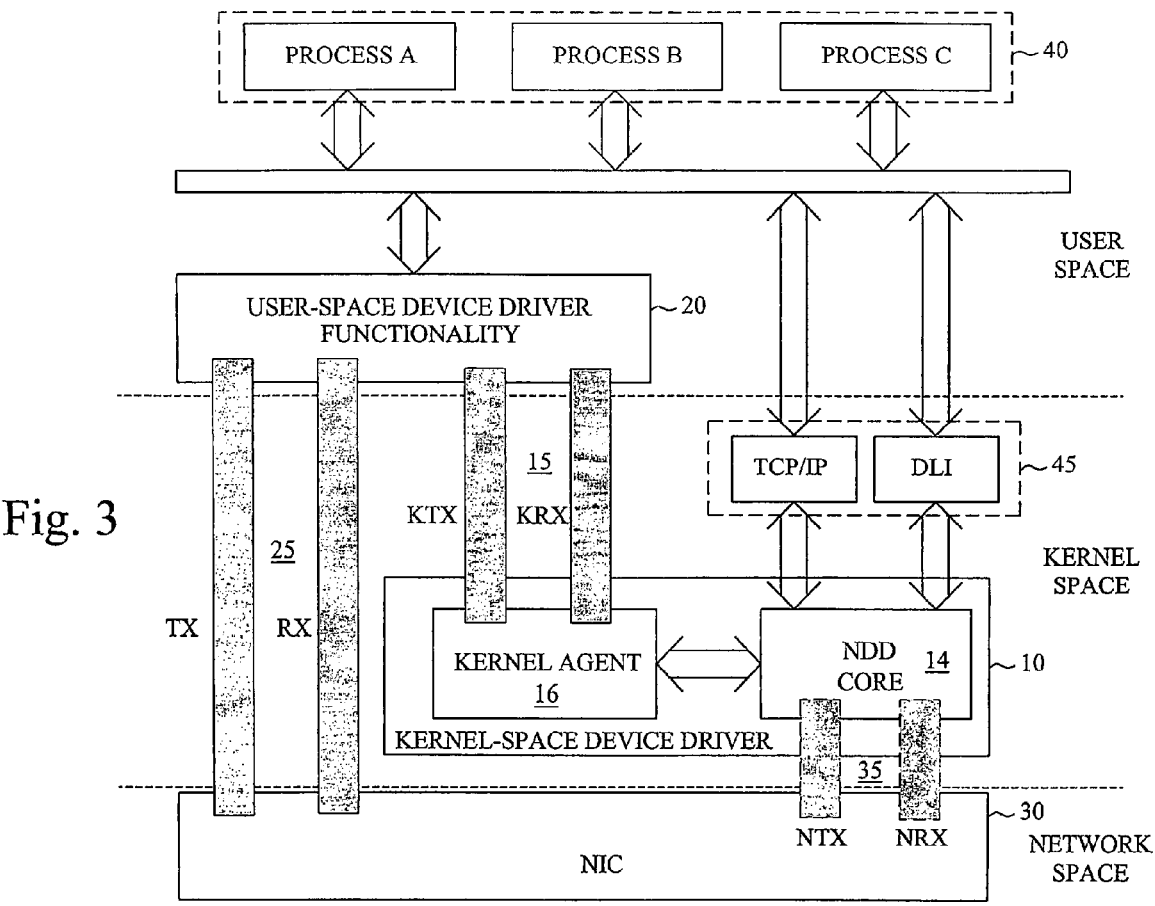
FIG. 3 is a schematic block diagram illustrating a preferred realization of the network device driver architecture according to the invention.

FIG. 3 is a schematic block diagram illustrating a preferred realization of the network device driver architecture according to the invention. The kernel-space device driver 10 preferably has two basic building blocks, a network device driver core (NDD core) 14 and a kernel space agent 16. Together with the user-space device driver functionality 20, the NDD core 14 and the kernel agent 16 generally define the overall network device driver architecture.

User-space messages are exchanged between user space and NIC without kernel involvement, and since the user-space device driver functionality typically works in polling mode, there will be no per message interrupts. Messages originating from kernel-level users are tunneled between the NDD core 14 and the NIC 30, via the kernel agent 16, the user-space device driver functionality 20 and the associated interfaces 15, 25.

Most operating systems such as Tru64, Linux, Windows and OSE support some form of device driver framework, which comprises a set of rules, interfaces and guidelines on how to develop device drivers. These frameworks are well documented and OS vendors often supply tools for generating device driver templates, thus saving valuable design time and effort for developing new device drivers. The network device driver core 14 as well as the kernel agent 16 are generally implemented according to a suitable device driver framework.

The network device driver core 14 is preferably based on a standard network device driver, for example obtained from a commercial vendor, with additional functionality for making the device driver work in both default mode as well as the user-space tunneled access mode of the invention. Source code for the design base network device driver can usually be obtained from the device driver vendor, or by using freely available source code (Linux, NetBSD and FreeBSD for example). The design base adaptation for allowing user-space tunneling can typically be realized by adding about 50 lines of code (~1% of the design base code) to the design base device driver. It is also possible to design the NDD core 14 in-house by using any of the available tools for generating device drivers.

In default mode, the NDD core 14 operates as an ordinary network device driver, directly accessing the NIC.

In user-space tunneled access mode, the NDD core 14 routes outgoing data to the kernel agent 16 and receives incoming data from the kernel agent. The NDD core or the user-space device driver functionality preferably also masks interrupts related to message processing since the user-space device driver functionality 20 normally works in polling mode.

Conveniently, the kernel agent 16 performs some initialization procedures, allocates contiguous memory, implements the kernel-space-user-space interface 15 as well as the interface to/from the NDD core 14, and maps contiguous memory and memory mapped configuration and state registers (CSR) to the address space of the user-space device driver functionality 20. The kernel agent 16 supports transfer of messages between the NDD core 14 and the user-space device driver functionality 20 via the kernel-space-user-space interface 15. Since the FIFO queues KTX, KRX of the kernel-space-user-space interface are allocated in kernel address space and mapped to user address space, no message copying is required between the kernel agent 16 and the user-space device driver functionality 20. The kernel agent module is generally not dependent on the particular NIC used by the system, and can transparently and simultaneously support different types of NIC controllers, including Fast Ethernet, Gigabit Ethernet and ATM NIC controllers.

The kernel agent 16 may also be adapted for monitoring the status of any process using the user-space device driver functionality 20. This makes it possible for the kernel agent to order the NDD core 14 to switch back to default mode in the case of a user process failure.

In a typical case, the kernel agent 16 may be realized by approximately 200 lines of new code together with about 300 lines of standard device driver framework code.

As mentioned above, the user-space device driver functionality 20 is a small part of the overall device driver functionality, and preferably implemented as user library functionality executing in user space. It normally works in polling mode and supports direct exchange of messages between user-space and NIC. Typically, the user-space device driver functionality may be realized by approximately 200 lines of code.

The interface between the kernel-level protocols 45 such as TCP/IP and DLI (Data Link Interface) on one hand and the NDD core 14 on the other hand is conveniently an existing network device driver API (Application Programming Interface) supplied with the OS.

The interface between the NDD core 14 and the kernel agent 16 is normally an API that supports sending/receiving messages over a specific NIC.

The interface 15 between the kernel agent 14 and the user-space device driver functionality 20 is preferably realized as a standard file interface, supporting user-space device driver functionality requests for opening a connection towards the kernel agent, mapping of contiguous buffer memory and memory mapped CSR from the kernel agent to application context. If desired, it may also support the watchdog functionality implemented in the kernel agent as well as NIC status notification from the kernel agent 16 to the user-space device driver functionality 20. Message transfer between the kernel agent 14 and the user-space device driver functionality 20 is realized by means of a shared memory structure, as previously described.

The interface between the user application 40 and the user-space device driver functionality 20 is normally an API that supports sending/receiving messages directly between the user address space and the NIC 30, in combination with the FIFO-queue based interface 25 between the user-space device driver functionality 20 and the NIC 30. This interface can be realized as a standard VI interface.

Figure 4:
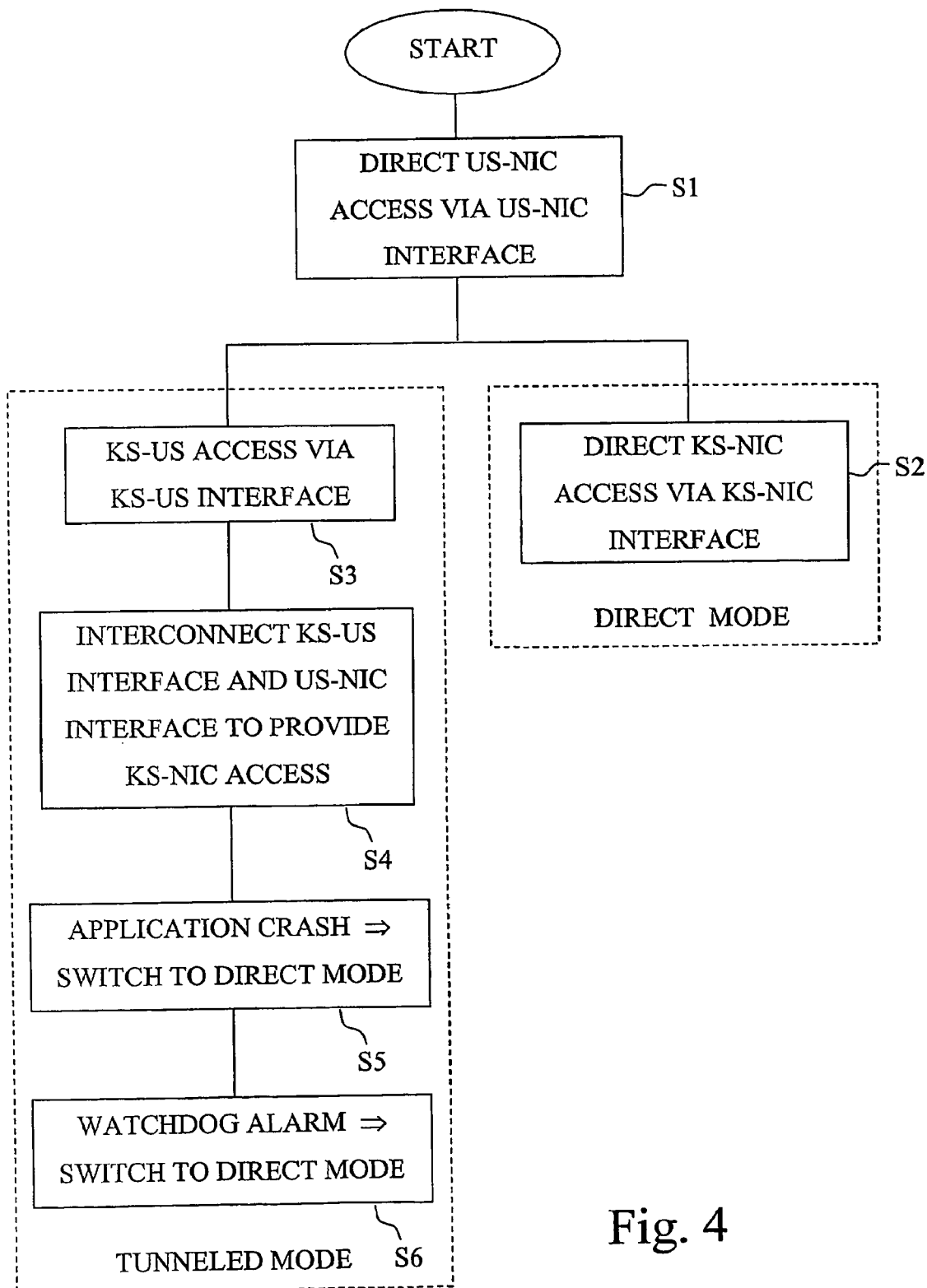
FIG. 4 is a schematic flow diagram of a method for network access according to a preferred embodiment of the invention.

FIG. 4 is a flow diagram of a method for network access according to a preferred embodiment of the invention. In step S1, direct access between user space and the NIC is provided via a user-space-NIC interface. In step S2, which relates to the default operation mode, direct access between kernel space and the NIC may be provided via a kernel-space-NIC interface. In user-space tunneled access mode, access between kernel space and NIC is provided in two steps, by providing a kernel-space-user-space-interface in step S3 and by interconnecting the kernel-space-user-space interface and the direct user-space-NIC-interface in step S4. The robustness and reliability is maintained by switching back to default mode in step S5 if the application crashes. As a second line of defense, or as an alternative to step S5, a watchdog may be used as in step S6, switching back to default mode if there has been no call from user space for a predetermined period of time. In the following, illustrative examples of a number of different traffic cases in the distributed network device driver architecture of FIG. 3 will be described with reference to FIGS. 5-10, each of which only illustrates those system components that are relevant to the respective traffic case.

The computer system boots up and loads the operating system. The operating system is loaded with a network device driver in kernel space for allowing access to the network and more particularly to the network interface controller (NIC) 30. The kernel-space device driver will perform a standard initialization procedure as a design base network device driver (NDD), also referred to as the NDD core 14.

Additional functionality is registration to the kernel agent (not shown) from the attach procedure called for every NIC that the driver controls. In the registration procedure, a CSR pointer is sent to the kernel agent, and some callback functions are registered in the kernel agent (for switching between modes, resetting the NIC, pushing inbound messages received through the kernel agent, error reporting, and so forth).

Figure 5:
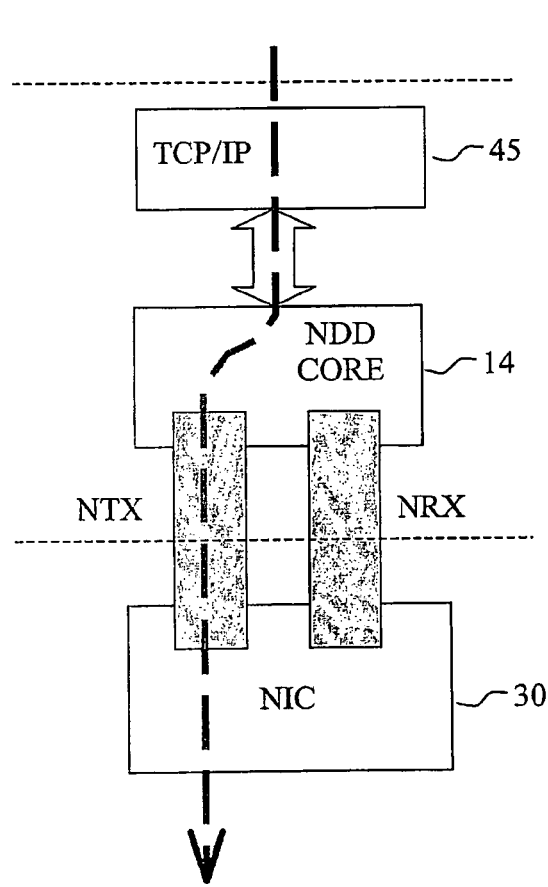
FIGS. 5-10 are simplified views illustrating different traffic cases in the distributed network device driver architecture of FIG. 3.
Figure 6:
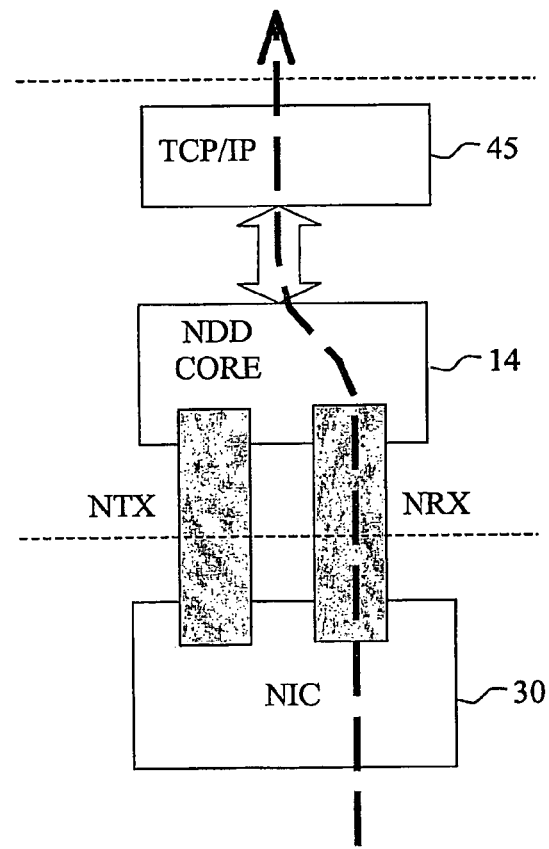

For every NIC controlled by the NDD driver, the operational mode is set to default, meaning that the message flow will go from the NDD core 14 directly to the NIC 30 and vice versa, as illustrated in FIGS. 5 and 6. In the outbound direction, illustrated in FIG. 5, the NDD core 14 operates as a design base NDD. Additional functionality involves checking whether the user-space tunneled mode is activated for this interface. If the user-space tunneled access mode is off, messages to the NIC are put in the NTX ring of the NDD core 14. In the inbound direction, illustrated in FIG. 6, the NDD core 14 operates as a design base NDD, and messages from the NIC are put in the NRX ring.

Next, a user application is initialized and started. The user-space device driver functionality 20 executing in application context of the user application opens a connection to the kernel agent 16 and indicates with which port it wants to communicate. It also requests from the kernel agent 16 the mapping of DMA area and CSR registers to its own address space, and the kernel agent 16 maps memory visible to the NIC 30 to user address space. The user-space device driver functionality 20 orders the kernel agent 16 to switch to user-space tunneled access mode. The kernel agent forwards the order to the NDD core 14, which first performs a reset and then marks that the user-space tunneled access mode is activated for this particular NIC interface. The NDD core 14 then performs basic initialization of the NIC 30, and the kernel agent 16 preferably initiates the watchdog functionality.

The user-space device driver functionality 20 sets registers in the NIC 30 indicating where the TX, RX rings are located. It may also set the NIC registers for improving performance over PCI (Peripheral Component Interconnect) or any other bus structure used by the invention. Subsequently, the user-space device driver functionality 20 enables the TX, RX engines.

Figure 7:
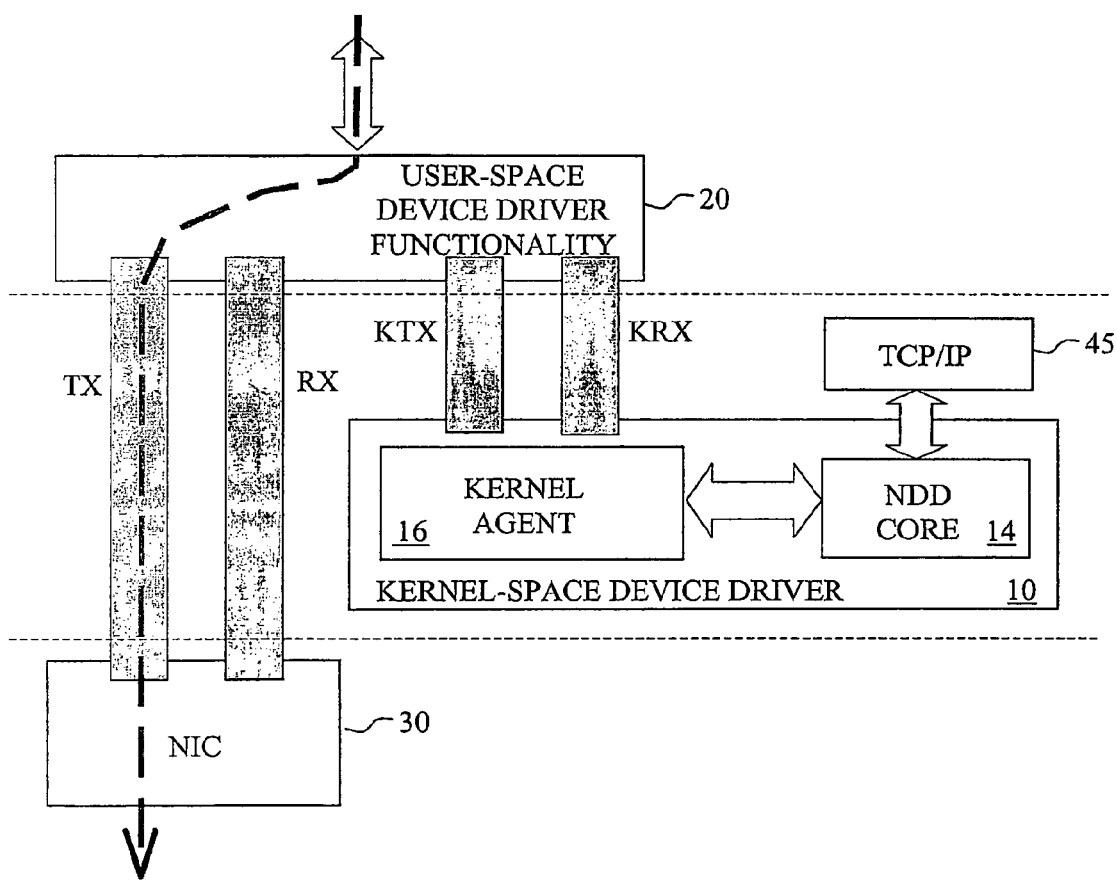

In the outbound direction from user space directly to the NIC, as illustrated in FIG. 7, the user application delivers message descriptors (similar to the descriptors used in the VIA architecture) or simple pointers to the user-space device driver functionality 20, which puts the message descriptors in the TX ring located in user address space. By working with message descriptors/pointers, instead of complete messages, there will be no actual message copying. The NIC 30 consumes the messages by using the message descriptors in the TX ring to find the relevant position in common memory.

Figure 8:
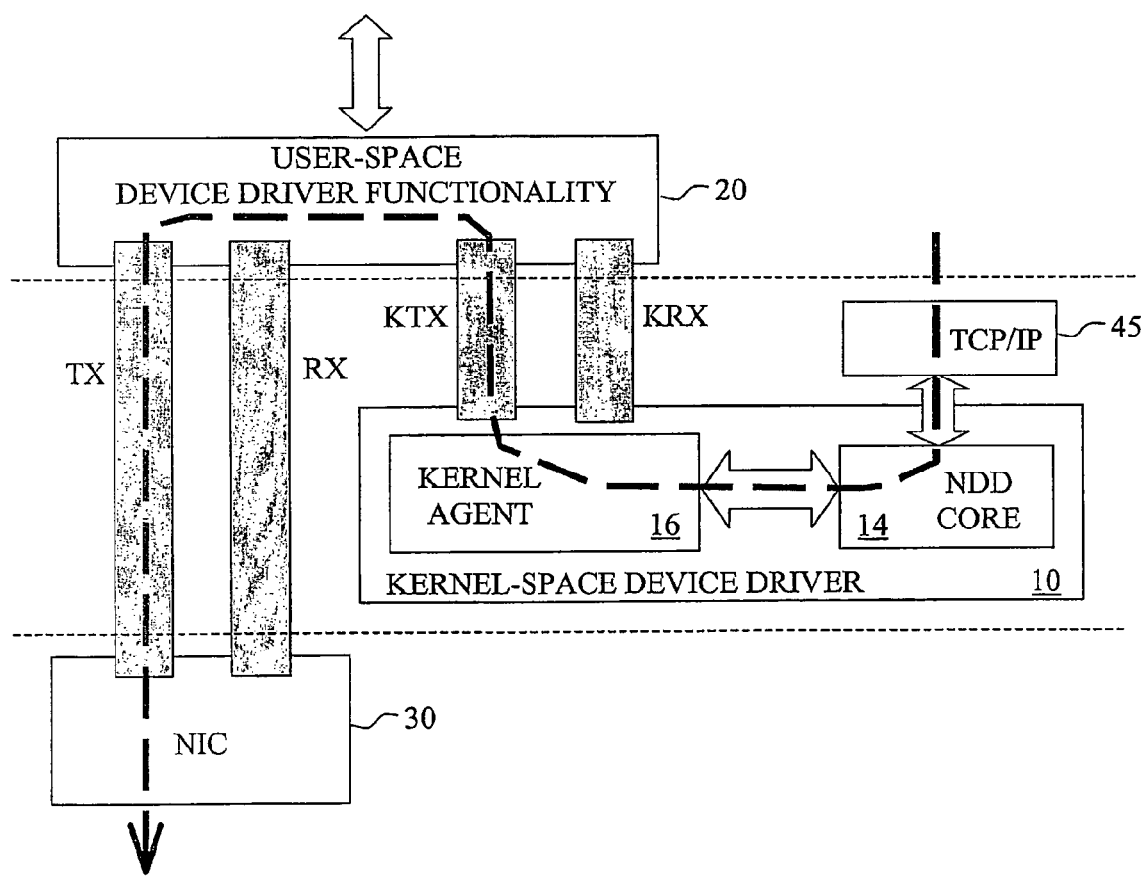

In the outbound direction from a kernel-level user to the NIC, as illustrated in FIG. 8, the NDD core 14 operates as a design base NDD with the additional functionality of checking if the user-space tunneled access mode is activated for this NIC interface. If the tunneled access mode is activated, the NDD core 14 delivers incoming message descriptors to the kernel agent 16, which puts the descriptors in the KTX ring used for communication with the user-space device driver functionality 20.

At a configurable interval, for example every 1 ms, the user-space device driver functionality 20 will normally poll the KTX ring and move-insert descriptors into the TX ring used for communication between the user-space device driver functionality 20 and the NIC 30. The NIC 30 finally consumes the messages by fetching them from common memory using the transferred message descriptors.

Figure 9:
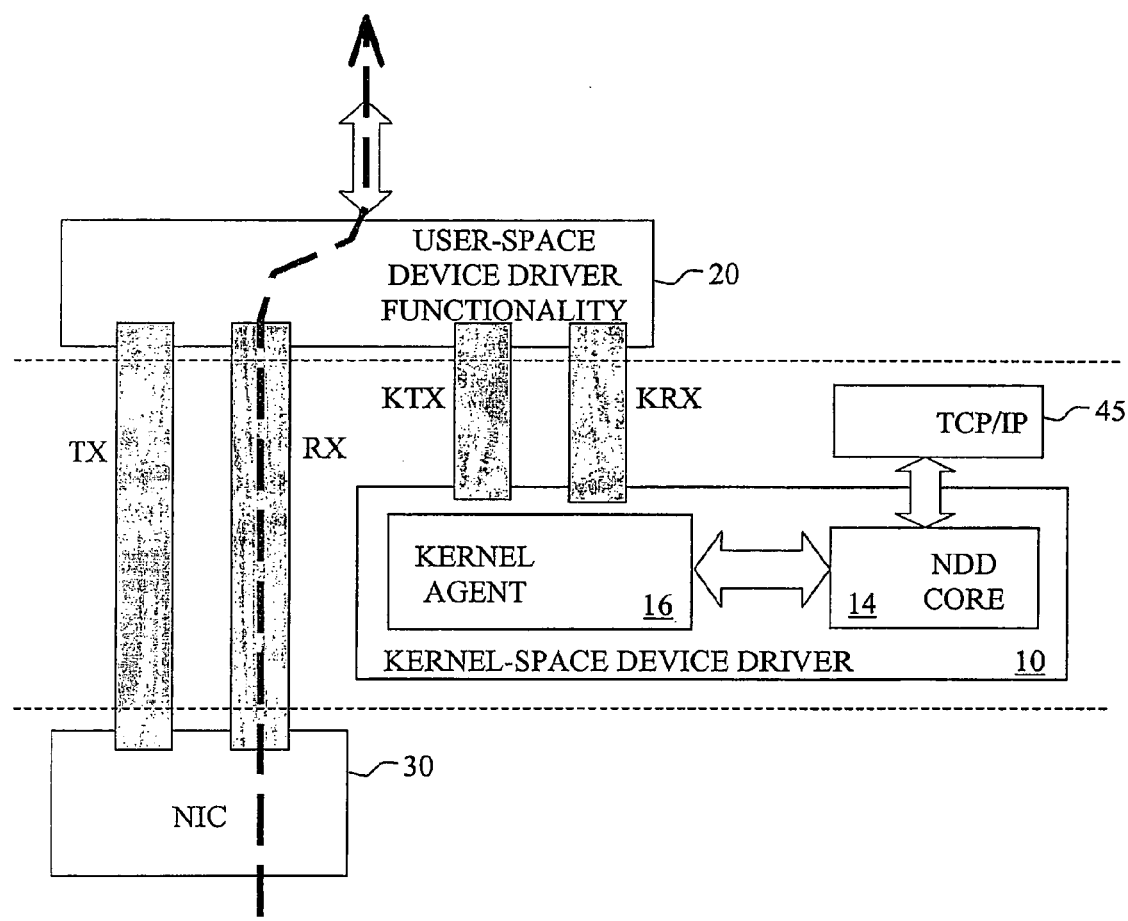
Figure 10:
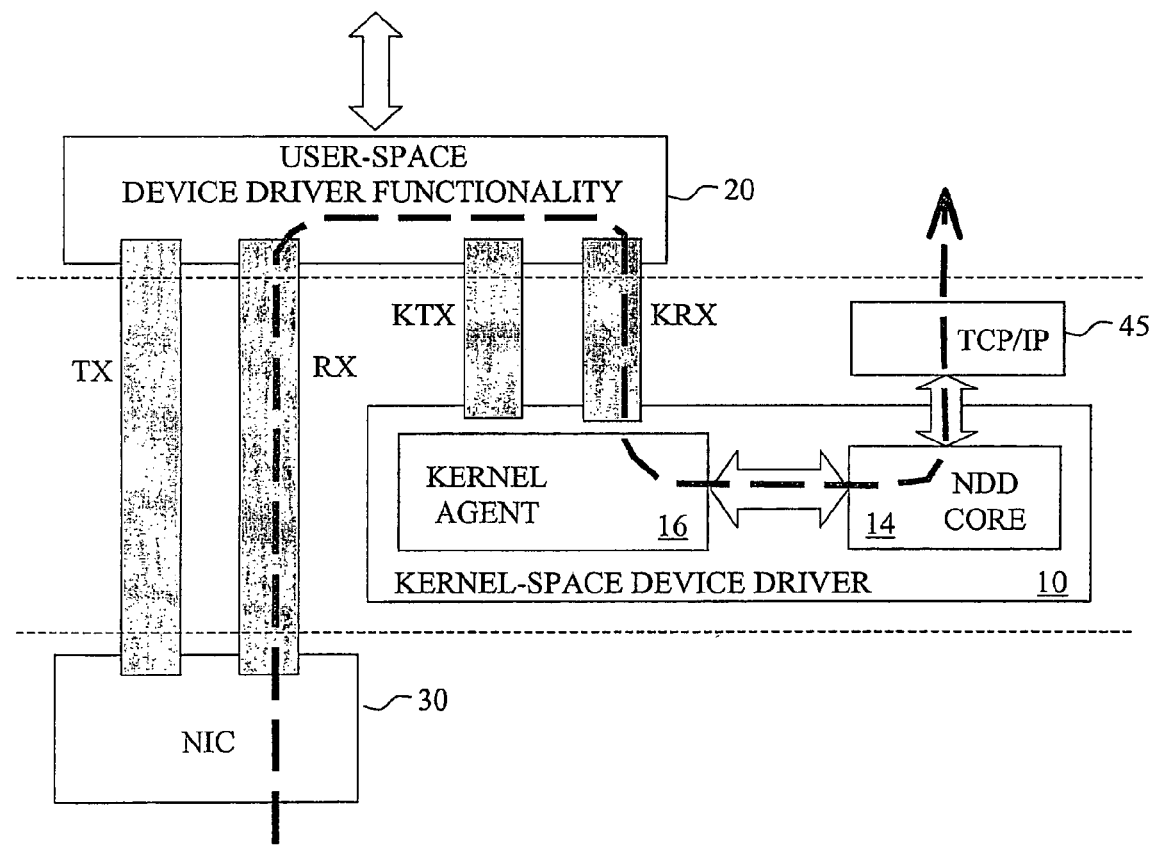

Two different traffic cases in the inbound direction from the NIC are illustrated in FIGS. 9 and 10. The NIC 30 puts descriptors associated with inbound messages in the RX ring, and the user-space device driver functionality 20 is polled for incoming message descriptors. The message descriptors are fetched from the RX ring. For each message, it is investigated whether the (Ethernet) type matches the one that the user application expects. If there is a match, the message is delivered to the user, as illustrated in FIG. 9. If there is no match, the message descriptor is inserted into the KRX ring, corresponding to FIG. 10. At a configurable interval, for example every 1 ms, the user-space device driver functionality 20 calls the kernel agent 16. The kernel agent 16 then fetches descriptors relating to inbound messages from the KRX ring and delivers them to the NDD core 14, which performs the necessary operations for delivering the messages to the kernel-level user.

If the user application crashes, the operating system will normally inform the kernel agent 16, which in turn will order the NDD core 14 to switch back to default mode. As an optional second line of defense, or as an alternative, the kernel agent 16 may be provided with a watchdog for handling the case when the operating system for some reason fails to inform the kernel agent 16 that the user application has crashed. For example, the watchdog may be implemented in such a way that it orders the NDD core 14 to switch back to default mode if there is no call from the user-space device driver functionality 20 for a predetermined period, for example 10 ms. This will make sure that the NDD base functionality is never lost for more than a predetermined minimum period of time.

Figure 11:
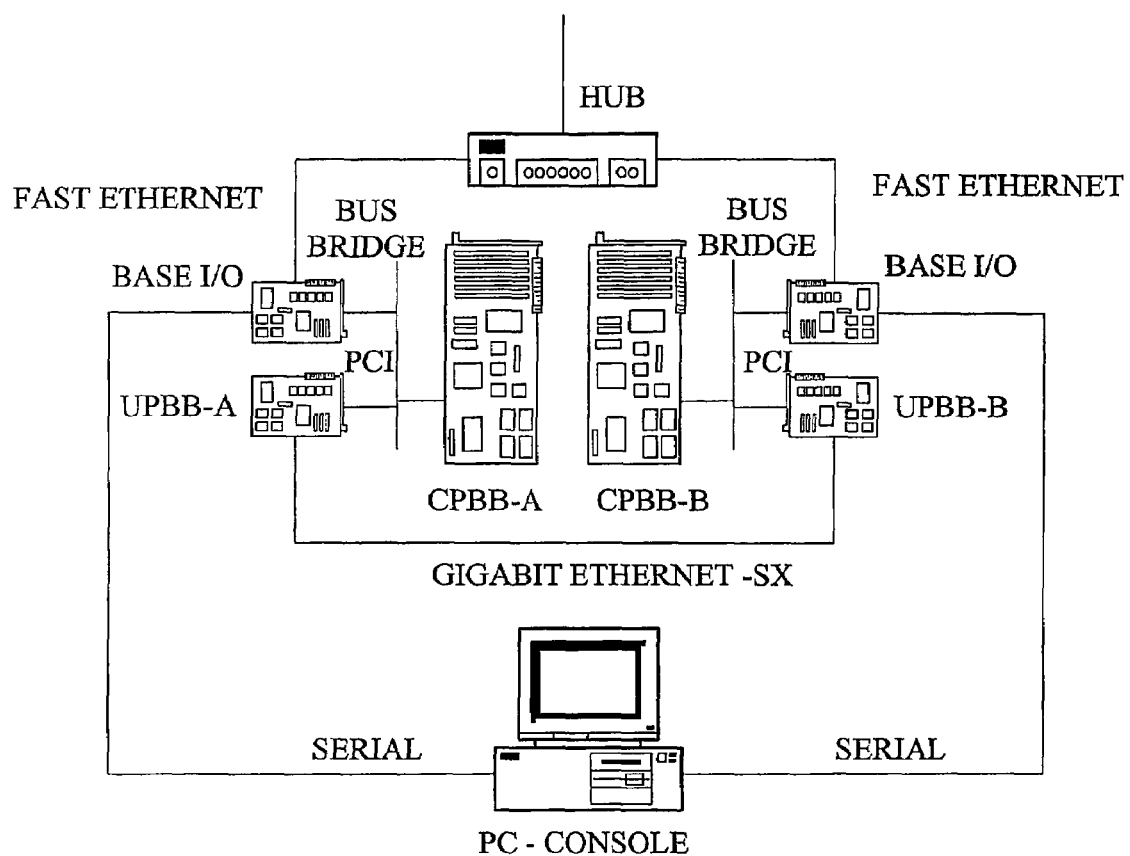
FIG. 11 illustrates a particular example of an overall system implementation.

A particular example of an overall system implementation is illustrated in FIG. 11. The overall system comprises:

- Two central processor base boards (CPBB-A, CPBB-B). Each CPBB board comprises one or more Alpha servers (EV68ab, 667 MHz) and 1 GB of RAM.
- Two updating bus boards (UPBB-A, UPBB-B), one per CPBB. Each UPBB board comprises an Intel 82543GC Gigabit Ethernet NIC, together with other UPBB components.
- A 32 bit/66 MHz cPCI bus between CPU and the cPCI-PCI bridge, and a 64 bit/33 MHz PCI bus between the cPCI-PCI bridge and the Intel 82543GC NIC.
- A Gigabit Ethernet fiber connection (SX) between the two CPBB-UPBB pairs, which are connected back-to-back.
- Two base I/O units, each of which is connected to the cPCI-PCI bridge, and to an optional network hub as well as serially connected to a PC-console.

In prototype testing, one CPBB was used for execution of the server instance of a test program, the other CPBB for execution of the client instance of the test program. The PC-console is used for accessing the application running on the CPBBs.

Measurements indicate that with efficient protocol termination in user space it is actually possible to eliminate the CPU as a bottleneck in the communication chain. In full-duplex tests, the PCI bus becomes the bottleneck, while in half-duplex tests for messages larger than 498 octets, Ethernet becomes the bottleneck. The fact that the PCI bus becomes the bottleneck is not surprising since it is a shared bus. Today, there exist much better PCI busses on the market. This particular Intel NIC supports 64 bit/66 MHz PCI bus, substantially doubling the capacity compared to using the 64 bit/33 MHz PCI bus mentioned above. The PCI-X also on the market today runs on 64 bit/133 MHz. The PCI-X 2.0 will enable the bus to run in dual data rate (266 MHz) as well as quadruple data rate (532 MHz). In addition, PCI-SIG (PCI Special Interest Group) will release PCI 3.0, which is a switch to serial interconnection enabling faster throughput, smaller footprint and backward compatibility towards software users. Obviously, there is a smooth path in increasing PCI bus throughput in the system.

Measurements have shown that with the co-existence of user-space and kernel-space protocols over the same Ethernet port, it is possible to achieve a stable rate of 435 000 signal pairs per second (50 octets of data) between the two Alpha-based CPBB servers over PCI and Gigabit Ethernet with just 28.73% processor load. With a standard network device driver in the same processor environment, the processor load will reach 100% already at 46 000 signal pairs per second.

The embodiments described above are merely given as examples, and it should be understood that the present invention is not limited thereto. It is also important to note that the invention is not dependent on communication technology (Ethernet, ATM, Infiniband, . . . ), operating system (Tru64, Linux, Solaris, Win, . . . ) or host CPU (Alpha, Intel, PowerPC, . . . ).

Furthermore, the invention is relevant to all types of information and data, as well as all types of networks, including LAN (Local Area Network), MAN (Metropolitan Area Network), WAN (Wide Area Network) and SAN (System Area Network) networks.

Further modifications, changes and improvements which retain the basic underlying principles disclosed and claimed herein are within the scope of the invention.

The invention claimed is:

1. A method for enabling access between operating system kernel space and a network interface controller (NIC) as well as between user space and said NIC, wherein the method is performed by a kernel-space device driver and a user-space device driver, said method comprising the steps of:
enabling access between kernel space and user space via a kernel-space-user-space interface;
enabling direct access between user space and said NIC via a user-space-NIC interface;
interconnecting said kernel-space-user-space interface and said user-space-NIC interface to enable user-space tunneled access between kernel-space and said NIC;
providing simultaneous user-space and kernel-space access to a network layer over a single NIC port;
in a first operational mode of the kernel-space device driver, directly accessing the NIC from the kernel-space device driver via a kernel-space-NIC interface; and
in a second operational mode of the kernel-space device driver, accessing the NIC via the interconnected kernel-space-user-space interface and user-space-NIC interface;
wherein the step of enabling direct access between user space and the NIC and the step of interconnecting the kernel-space-user-space interface and the user-space-NIC interface are executed in application context of a user application, and an operating system orders the kernel-space device driver to switch to the first operational mode in response to a user application failure;
wherein the kernel-space device driver switches to the first operational mode if there is no user-space call to the kernel-space device driver for a predetermined period of time.

2. The method according to claim 1, wherein said interconnecting step comprises the steps of:
fetching pointer information, pointing to data in a common memory, from a memory buffer associated with one of said kernel-space-user-space interface and said user-space-NIC interface; and
inserting said pointer information into a memory buffer associated with another of said interfaces.

3. The method according to claim 1, further comprising, for outbound kernel-level protocol communication, the steps of said kernel-space device driver inserting pointer information, pointing to data in a common memory, into a transmit buffer associated with said kernel-space-user-space interface, and said user-space device driver functionality fetching said pointer information therefrom and inserting it into the transmit buffer associated with said user-space-NIC interface, and said NIC fetching said pointer information from the transmit buffer associated with said user-space-NIC interface and reading corresponding data from said common memory based on the obtained pointer information.

4. The method according to claim 1, further comprising, for inbound kernel-level protocol communication, the steps of:
said NIC inserting pointer information, pointing to data in a common memory, into a receive buffer associated with said user-space-NIC interface;
said user-space device driver functionality fetching said pointer information from the receive buffer associated with said user-space-NIC interface and inserting it into the receive buffer associated with said kernel-space-user-space interface; and
said kernel-space device driver fetching said pointer information for transfer to a kernel-level protocol, which reads the corresponding data from said common memory based on the pointer information.

5. The method according to claim 1, wherein said step of enabling direct access between user space and said NIC and said interconnecting step are executed in application context of a user application.

6. The method according to claim 5, wherein said step of enabling direct access between user space and said NIC and said interconnecting step are performed by user-space device driver functionality implemented as user-space library functionality.

* * * * *